(12) United States Patent
Boersma et al.

(10) Patent No.: US 9,122,517 B2
(45) Date of Patent: Sep. 1, 2015

(54) FUSED MULTIPLY-ADDER WITH BOOTH-ENCODING

(75) Inventors: Maarten J. Boersma, Holzgerlingen (DE); Klaus Michael Kroener, Ehningen (DE); Christophe J. Layer, Boeblingen (DE); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 13/493,002

(22) Filed: Jun. 11, 2012

(65) Prior Publication Data

US 2013/0332501 A1   Dec. 12, 2013

(51) Int. Cl.
G06F 7/483   (2006.01)
G06F 7/53   (2006.01)
G06F 7/544   (2006.01)
G06F 7/509   (2006.01)
G06F 7/533   (2006.01)

(52) U.S. Cl.
CPC ............... *G06F 7/483* (2013.01); *G06F 7/509* (2013.01); *G06F 7/5324* (2013.01); *G06F 7/5332* (2013.01); *G06F 7/5443* (2013.01)

(58) Field of Classification Search
CPC .............................. G06F 7/5324; G96F 7/5443
USPC ................................................. 708/501, 503
See application file for complete search history.

(56) References Cited

U.S. PATENT DOCUMENTS

| 5,880,985 | A  | * | 3/1999 | Makineni et al. | 708/625 |
| 5,928,316 | A  |   | 7/1999 | Wong et al.     |         |
| 6,223,198 | B1 | * | 4/2001 | Oberman et al.  | 708/620 |
| 6,609,143 | B1 | * | 8/2003 | Kanakogi et al. | 708/603 |
| 8,037,119 | B1 |   | 10/2011 | Oberman et al. |         |

OTHER PUBLICATIONS

Qi et al., "Design of Low-Cost High-Performance Floating-Point Fused Multiply-Add with Reduced Power", IEEE, pp. 206-211, 2010.*
Chong et al., "Configurable Multimode Embedded Floating-Point Units for FPGAs" IEEE, pp. 2033-2044, 2010.*
Huang et al. "A New Architecture for Multiple-Precision floating-Point Multiply-Add Fused Unit Design", IEEE, 8 pages, 2007.*
Bewick, Gary—"Fast Multiplication: Algorithms and Implementation"; A Dissertation submitted to the Dept. of Electrical Engineering and the Committee of Graduate Studies of Stanford University; Feb. 1994.

* cited by examiner

*Primary Examiner* — Chuong D Ngo
(74) *Attorney, Agent, or Firm* — Russell Ng PLLC; Matthew Baca

(57) ABSTRACT

A fused multiply-adder is disclosed. The fused multiply-adder includes a Booth encoder, a fraction multiplier, a carry corrector, and an adder. The Booth encoder initially encodes a first operand. The fraction multiplier multiplies the Booth-encoded first operand by a second operand to produce partial products, and then reduces the partial products into a set of redundant sum and carry vectors. The carry corrector then generates a carry correction factor for correcting the carry vectors. The adder adds the redundant sum and carry vectors and the carry correction factor to a third operand to yield a final result.

8 Claims, 5 Drawing Sheets

FUSED MULTIPLY-ADDER WITH BOOTH-ENCODING

BACKGROUND OF THE INVENTION

1. Technical Field

The present disclosure relates to digital arithmetic circuits in general, and, in particular, to fused multiply-adder circuits.

2. Description of Related Art

The institute of Electrical and Electronics Engineers (IEEE) standard for floating-point arithmetic defines specific formats for representing floating-point numbers. According to the IEEE standard, a floating-point number includes a sign bit, an exponent, and a fraction. The value of a floating-point number X is represented by:

$$X = (-1)^{Xs} * (1.Xf) * 2^{(Xe-bias)}$$

where Xs is a sign bit, 1.Xf is intended to represent the binary number created by prefixing Xf with an implicit leading 1 and a binary point, and Xe is the unsigned binary exponent. If Xe=0, X is considered a denormalized number, and its value is instead represented by:

$$X = (-1)^{Xs} * (0.Xf) * 2^{(1-bias)}$$

The IEEE standard also defines floating-point numbers in multiple levels of precisions. For example, a single-precision floating-point number has an 8-bit exponent and a 23-bit fraction, a double-precision floating-point number has an 11-bit exponent and a 52-bit fraction, and a quadruple-precision floating-point number has a 15-bit exponent and a 112-bit fraction.

Modern computer processors typically include a floating-point unit to perform mathematical operations on floating-point numbers according to the IEEE standard. One important floating-point instruction is the multiply-add instruction that implements the operation $$T = A*B + C$$

in one step with only one rounding error (instead of two that would result from executing a multiply instruction followed by an add instruction). Two different approaches have been used for implementing the fused multiply-add instruction to support multiple precisions of floating-point numbers. The first approach uses separate data paths for each number precision, so instructions using single- and double-precision numbers, for example, can be executed at the same time, but at the expense of a larger chip area. The second approach uses only one data path capable of handling both single- and double-precision numbers, but only half the operand bandwidth is utilized when handling single-precision numbers.

Consequently, it would be desirable to provide an improved fused multiply-adder for performing multiply-add instructions.

SUMMARY OF THE INVENTION

In accordance with a preferred embodiment of the present disclosure, a fused multiply-adder includes a Booth encoder, a fraction multiplier, a carry corrector, and an adder. Operands for the fused multiply-adder can be full-precision numbers and/or lesser precision numbers having at least one zero guard bit separating individual numbers. The Booth encoder initially encodes a first operand. The fraction multiplier multiplies the Booth-encoded first operand by a second operand to produce partial products, and then reduces the partial products into a set of redundant sum and carry vectors. The carry corrector then generates a carry correction factor for correcting the carry vectors. The adder adds the redundant sum and carry vectors and the carry correction factor to a third operand to yield a final result of a multiply-add operation.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Introduction

A multiply-add instruction implements the equation $$T = A*B + C$$

where A, B and C are three separate operands. For ease of illustration, the method of the present invention will be illustrated using two single-precision operations computed simultaneously in double-precision hardware. However, it is understood by those skilled in the art that the method of the present invention can readily be extended to k-way operations, each computed in n/k bit precision, where n is the maximum precision of the underlying hardware. Thus, for example, four single-precision or two double-precision operations can be simultaneously supported by quadruple-precision hardware.

II. Fused Multiply-Adder

Figure 1:
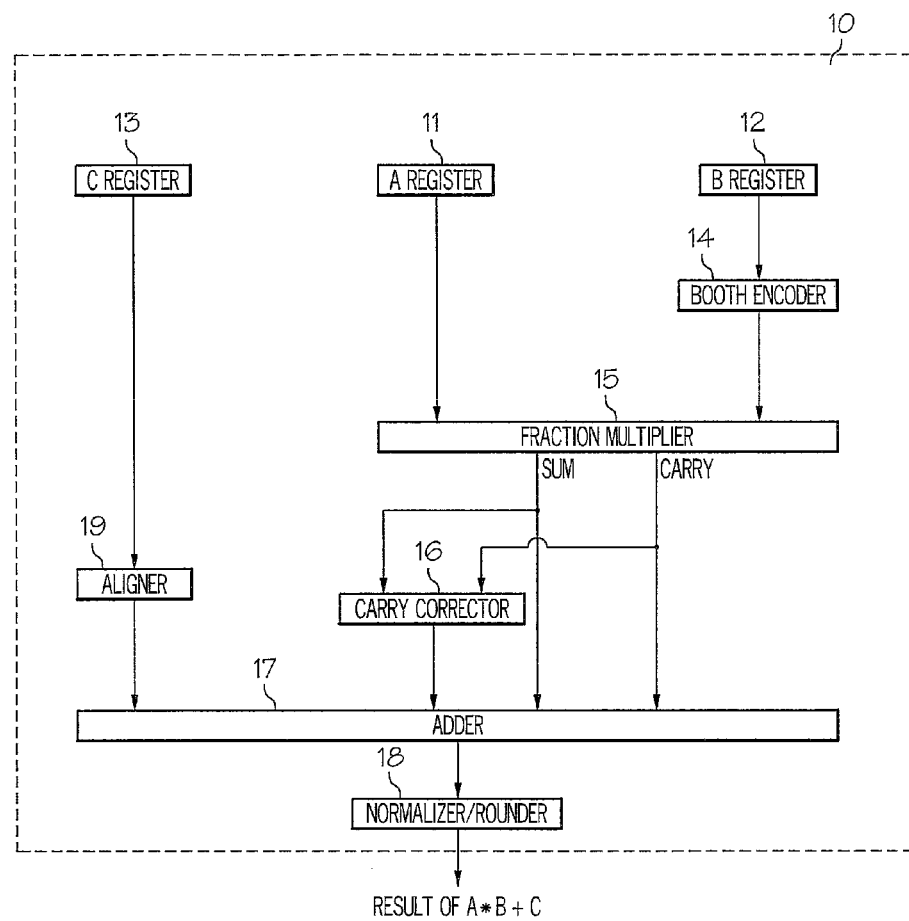
FIG. 1 is a block diagram of a fused multiply-adder, in accordance with a preferred embodiment of the present invention.

Referring to the drawings and in particular to FIG. 1, there is depicted a block diagram of a fused multiply-adder, in accordance with a preferred embodiment of the present invention. As shown, a fused multiply-adder 10 includes an A register 11, a B register 12, a C register 13, a Booth encoder 14, a fraction multiplier 15, a carry corrector 16, an adder 17, a normalizer/rounder 18 and an aligner 19. Booth encoder 14 initially encodes an operand within B register 12. Fraction multiplier 15 multiplies the result from Booth encoder 14 with an operand within A register 11 to generate a set of partial products via a partial product generator (not shown) within fraction multiplier 15. The partial products are then reduced via a partial product reducer (not shown) within fraction multiplier 16. The partial products are in a redundant carry-sum form having carry and sum vectors such that partial products P=operand A*operand B=carry+sum.

Fused multiply-adder 10 can operate in full-precision mode or two-way mode. With full-precision mode, each of A register 11, B register 12, and C register 13 contains an operand occupying the full width of the register. With two-way mode, each of A register 11, B register 12, and C register 13 contains two operands that are separated by sufficient guard zeros to allow the partial products P of operand A*operand B to retain at least one guard zero between its constituent parts. With full-precision mode, fused multiply-adder 10 outputs one full-precision number. With two-way mode, fused multiply-adder 10 outputs two numbers of the same precision as their respective operands.

When operating in full-precision mode, the Booth-encoding of one set of input multiplicands will not lead to any errors in the final result. However, when operating in two-way mode, the Booth-encoding of one set of input multiplicands may cause error in the final result unless a set of carry correction factors is applied to correct the carry vectors within adder 17. Carry corrector 16 provides the computations in order to generate the necessary carry correction factors within adder 17.

Adder 17 then adds the carry and sum vectors and the carry correction factors to an operand within C register 13, which has been correctly aligned via aligner 19. After normalizing and rounding the result from adder 17 via normalizer/rounder 18, fused multiply-adder 10 outputs a floating-point result of A*B+C.

III. Predicting Carry Bit r

Under two-way mode, each of carry (C) and sum (S) vectors is split into lower halves, $C_{LO}$, $S_{LO}$, and higher halves, $C_{HI}$, $S_{HI}$, with at least one guard zero in between. Thus, the half-width partial products may be defined as $$P_{HI}=A_{HI}*B_{HI}=C_{HI}+S_{HI}$$

$$P_{LO}=A_{LO}*B_{LO}=C_{LO}+S_{LO}$$

resulting in the full-width partial products as:

$$P=P_{HI}+P_{LO}=C_{HI}+S_{HI}+C_{LO}+S_{LO}$$

where the HI and LO terms do not overlap. The boundary between the HI and LO terms is the same for all terms, and is chosen to ensure that there is at least one guard zero between the HI and LO terms.

Figure 2:
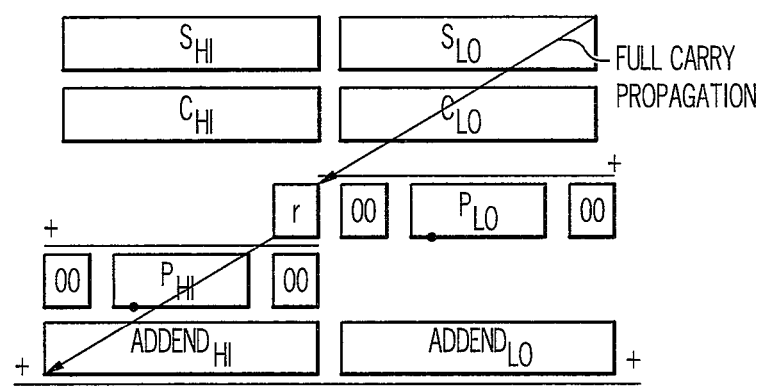
FIG. 2 illustrates a full carry propagation during an addition phase.

When the sum and carry vectors are added, the result becomes $$S_{LO}+C_{LO}=P_{LO}+r \quad (1)$$

$$S_{HI}+C_{HI}=P_{HI}-r \quad (2)$$

where r is a carry bit produced from the addition of the lower halves, as depicted in FIG. 2.

However, r is an artifact of the Booth encoding of an operand within B register 12 and the addition of the subsequent partial products. Thus, r should not be included in the final calculation result, and must be corrected for. Also, the correction cannot be delayed until r becomes known as it will ripple from the lower half to the higher half during the addition operation. Since r must be added and subtracted before it is known, it must be predicted.

M can be defined as the most significant bit position in $S_{LO}$ and $C_{LO}$, so that r has the significance M−1 (for the present embodiment, 0 is the most significant bit). The fact that the boundary between the higher half and lower half was chosen such that $P_M=0$ can be used to predict r in all cases, without waiting for r to be computed.

Case 1: If $S_M+C_M=0$, a possible carry generated in the lower order bits of $S_{LO}+C_{LO}$ can never ripple beyond bit position M. Hence r=0.

Case 2: If $S_M+C_M=1$, $P_M$ must be 0 because the boundary was chosen that way, and r=1.

Case 3: If $S_M+C_M=2$, bit position M is generating the carry out from $S_{LO}+C_{LO}$, so r=1. Any possible carry generated in the lower order bits of $S_{LO} C_{LO}$ can never ripple beyond position M.

The above-mentioned three cases can be reduced to $$r=S_M \text{ OR } C_M.$$

Hence, r can be predicted solely by examining $S_M$ and $C_M$ without waiting for actual calculation results.

IV. Computing the Corrected Sum

Equations (1) and (2) can be rearranged into $$P_{LO}=S_{LO}+C_{LO}-r$$

$$P_{HI}=S_{HI}+C_{HI}+r$$

In a fused multiply-add pipeline, partial products P are not computed explicitly. Instead the aligned addend fraction is added (or subtracted) before a full carry propagating addition begins. So, in full-precision mode, adder 17 (from FIG. 1) computes $$\text{sum}=S+C\pm\text{addend}$$

In two-way mode, taking r into account, adder 17 instead computes $$\text{sum}_{HI}=S_{HI}+C_{HI}+r\pm\text{addend (for the higher half)}$$

$$\text{sum}_{LO}=S_{LO}+C_{LO}-r\pm\text{addend (for the lower half)}$$

A carry-save adder is used to compress S+C+addend=ss+cc, where ss and cc are redundant sum and carry vectors, respectively. In this format, the equations for each individual bit i are $$ss_i=S_i \text{ XOR } C_i \text{ XOR addend}_i$$

$$cc_{i-1}=(S_i \text{ AND } C_i) \text{ OR } (S_i \text{ AND addend}_i) \text{ OR } (C_i \text{ AND addend}_i)$$

where bit position 0 is the most significant bit position.

A. Higher Half Correction

In two-way mode, M is the most significant bit position of the lower half and M−1 is the least significant bit position of the higher half. Since data in the lower half does not influence the data in the higher half, $cc_{M-1}$ is set to "0" in two-way mode; instead the predicted r can be inserted in this bit position.

In full-precision mode, from the general equation above, $$cc_{M-1}=(S_M \text{ AND } C_M) \text{ OR } (S_M \text{ AND addend}_M) \text{ OR } (C_M \text{ AND addend}_M).$$

But in two-way mode, the desired result is $$cc_{M-1}=r=S_M \text{ OR } C_M.$$

This can be rewritten in the same form as the full-precision equation $$cc_{M-1}=(S_M \text{ AND } C_M) \text{ OR } (S_M \text{ AND } 1) \text{ OR } (C_M \text{ AND } 1)$$

Both forms can be generalized into $$cc_{M-1}=(S_M \text{ AND } C_M) \text{ OR } (S_M \text{ AND } (\text{addend}_M \text{ OR 2-way}))$$

$$\text{OR } (C_M \text{ AND } (\text{addend}_M \text{ OR 2-way})) \quad (3)$$

where 2-way is a control signal set to 1 if this is a two-way mode operation and 0 otherwise. Equation (3) is valid for two-way mode as well as full-precision mode.

Figure 3A:
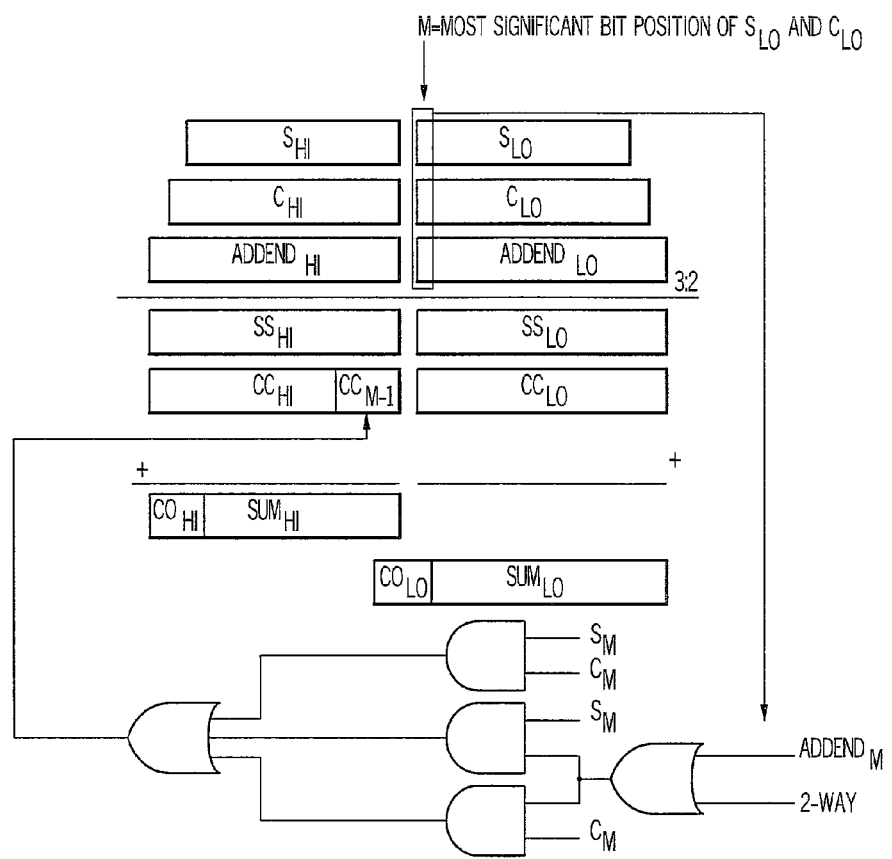
FIGS. 3A-3B illustrate a correction factor generation for a first half and a second half of a multiply-add result, respectively.

Hence, by substituting the $cc_{M-1}$ output from the carry-save adder with a circuit generating $$cc_{M-1} = (S_M \text{ AND } C_M) \text{ OR } (S_M \text{ AND } (\text{addend}_M \text{ OR } 2\text{-way}))$$

$$\text{OR } (C_M \text{ AND } (\text{addend}_M \text{ OR } 2\text{-way}))$$

during addend alignment, off the critical multiplier-adder path, the higher-half result of the dual-mode multiply-add operation is now correct, as illustrated in FIG. 3a.

B. Lower Half Correction

As previously described, bit r has a weight of M−1, which is the carry-out position of the lower half (or $\text{sum}_{LO}$) addition. Without correction, this carry-out bit will be wrong. The correct carry-out bit is denoted as $co_{LO}$.

The early carry-out can be computed using the general equation $$cc_{M-1LO} = (S_M \text{ AND } C_M) \text{ OR } (S_M \text{ AND } \text{addend}_M) \text{ OR } (C_M \text{ AND } \text{addend}_M)$$

while during the carry-propagating addition of $ss_{LO} + cc_{LO}$, a late carry-out $co'_{LO}$ is produced. All of these elements are related by the equation $$cc_{M-1LO} + co'_{LO} = r + co_{LO}$$

which can be rearranged into $$co_{LO} = cc_{M-1LO} + co'_{LO} - r$$

Then, the following three cases must be accounted for:

Case 1: If $\text{addend}_M = 1$, by the general equation $$cc_{M-1LO} = (S_M \text{ AND } C_M) \text{ OR } (S_M \text{ AND } 1) \text{ OR } (C_M \text{ AND } 1) = S_M \text{ OR } C_M = r$$

then $$co_{LO} = r + co'_{LO} - r = co'_{LO}$$

which can also be written as $$co_{LO} = co'_{LO} \text{ AND } \text{addend}_M$$

since $\text{addend}_M = 1$ and the AND operation with 1 has no effect.

Case 2: If $\text{addend}_M = 0$ and $S_M + C_M <> 1$, by the general equation $$cc_{M-1LO} = (S_M \text{ AND } C_M) \text{ OR } (S_M \text{ AND } 0) \text{ OR } (C_M \text{ AND } 0) = S_M \text{ OR } C_M = r$$

then as before, $$co_{LO} = r + co'_{LO} - r = co'_{LO}.$$

But here, $co'_{LO}$ will be 0, because as the guard bit, the sum of $S_M$ and $C_M$ must be 0, and $\text{addend}_M = 0$. Hence, $$co_{LO} = co'_{LO} = 0 = co'_{LO} \text{ AND } \text{addend}_M.$$

Case 3: If $\text{addend}_M = 0$ and $S_M + C_M = 1$, by the general equation $$cc_{M-1LO} = (S_M \text{ AND } C_M) \text{ OR } (S_M \text{ AND } \text{addend}_M) \text{ OR } (C_M \text{ AND } \text{addend}_M) = 0$$

but $$r = S_M \text{ OR } C_M = 1.$$

Hence, $$co_{LO} = cc_{M-1LO} + co'_{LO} - r = 0 + co'_{LO} - 1$$

which is only possible if $co'_{LO} = 1$ and $co_{LO} = 0$. As a result, once again $$co_{LO} = co'_{LO} \text{ AND } \text{addend}_M$$

is true.

Figure 3B:
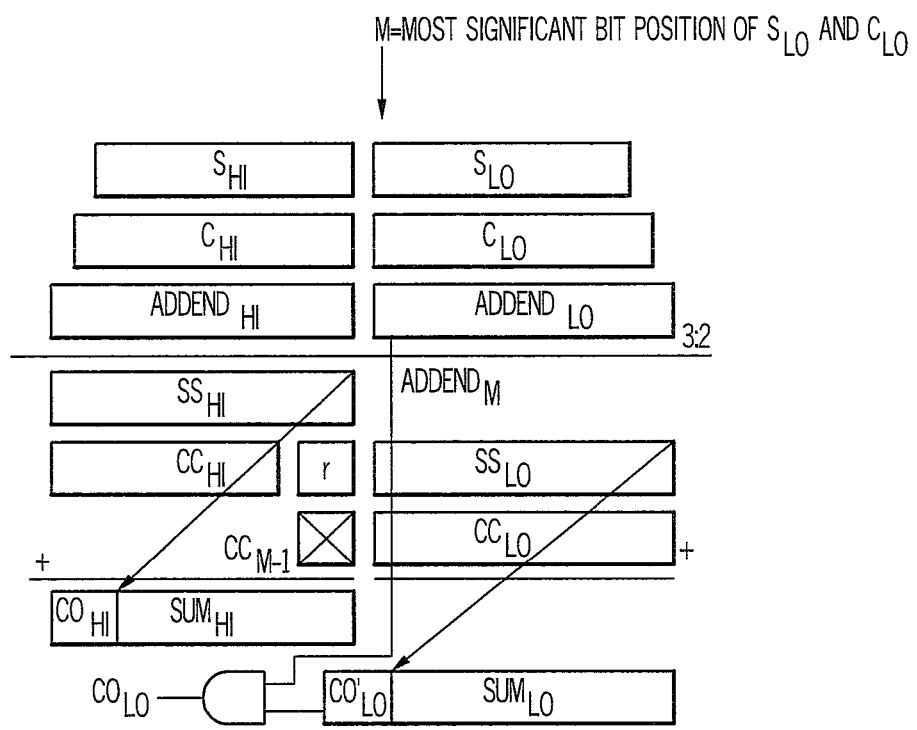

Thus, in all three cases, the correct carry out $co_{LO}$ from the lower half of the dual-mode multiply-add operation can be computed by ignoring $cc_{M-1LO}$ and instead using the result of $co'_{LO}$ and $\text{addend}_M$, as illustrated in FIG. 3b.

Figure 4:
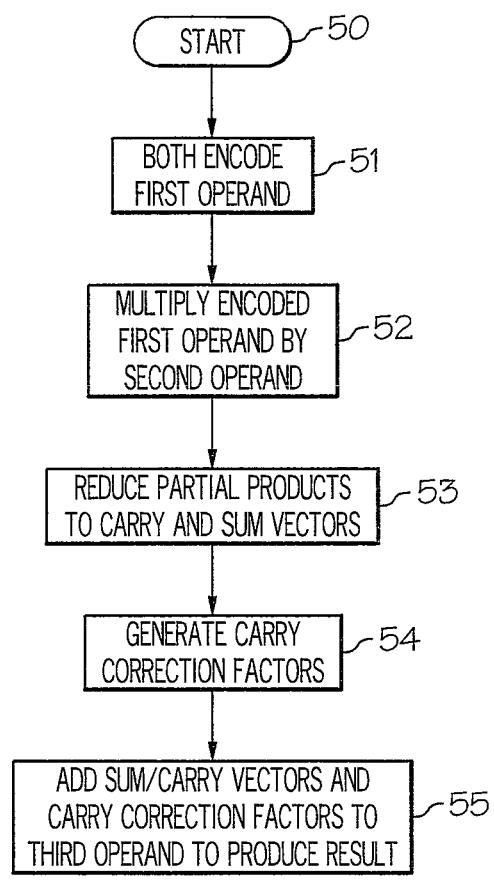
FIG. 4 illustrates a high-level logic flow diagram of a method for performing a multiply-and-add operation, in accordance with a preferred embodiment of the present invention.

With reference now to FIG. 4, there is illustrated a high-level logic flow diagram of a method for performing a fused-multiply and add operation, in accordance with a preferred embodiment of the present invention. Starting at block 50, a first operand is Booth-encoded, as shown in block 51. The encoded first operand is then multiplied by a second operand to generate a set of partial products, as depicted in block 52. The partial products are reduced to a set of redundant sum and carry vectors, as shown in block 53. A set of carry correction factors are also produced, as depicted in block 54. The sum and carry vectors and the carry correction factors are subsequently added to a third operand to produce a result of the fused-multiply and add operation, as shown in block 55.

As has been described, the present invention provides an improved fused multiply-adder. By incorporating appropriate corrections during the addition phase, it is possible to implement a fused multiply-adder that supports multiple-precision floating-point operands with a Booth-encoded multiplication operand.

While the disclosure has been particularly shown and described with reference to a preferred embodiment, it will be understood by those skilled in the art that various changes in form and detail may be made therein without departing from the spirit and scope of the disclosure.

What is claimed is:

1. A fused multiply-adder comprising:
   a Booth encoder for encoding a first operand;
   a fraction multiplier for multiplying said encoded first operand by a second operand to produce partial products, and for reducing said partial products to a set of sum and carry vectors, wherein one of said sum vectors includes a high sum vector and a low sum vector, and one of said carry vectors includes a high carry vector and a low carry vector;
   a carry corrector for generating a set of carry correction factors to correct an artifact carry bit when said first operand is less than a full-precision of said fused multiply-adder, wherein said carry correction factors are determined by $S_M$ OR $C_M$, wherein said $S_M$ is a boundary bit position located between said high sum vector and said low sum vector, said $C_M$ is a boundary bit position located between said high carry vector and said low carry vector; and
   an adder circuit for operating on said sum and carry vectors, said set of carry correction factors and a third operand to produce a final result.

2. The fused multiply-adder of claim 1, wherein said carry corrector uses said carry correction factors to correct one bit within said high carry vector and one bit within said low carry vector.

3. The fused multiply-adder of claim 1, wherein said fraction multiplier further includes a partial product generator for generating said partial products.

4. The fused multiply-adder of claim 1, wherein said fraction multiplier further includes a partial product reducer for reducing said partial products.

5. The fused multiply-adder of claim 1, wherein said fused multiply-adder further includes an aligner for aligning bit positions of said third operand.

6. The fused multiply-adder of claim 1, wherein said first, second and third operands are pairs of single-precision floating-point numbers separated by at least one guard zero bit.

7. The fused multiply-adder of claim 1, wherein said first, second and third operands are double-precision floating-point numbers.

8. The fused multiply-adder of claim 1, wherein said first, second and third operands are pairs of double-precision floating-point numbers separated by at least one guard zero bit.

* * * * *